United States Patent Office 3,426,103
Patented Feb. 4, 1969

3,426,103
TRANSPARENT INTERPOLYMERS OF A RUBBER ACRYLONITRILE AND TERT.-ALKYL STYRENES
Richard H. Hall, Midland, Junior L. Lamson, Bay City, and Andrew J. Sikkema, Midland, Mich., assignors to The Dow Chemical Company, Midland, Mich., a corporation of Delaware
No Drawing. Continuation-in-part of application Ser. No. 292,063, July 1, 1963. This application Jan. 26, 1967, Ser. No. 611,819
U.S. Cl. 260—880          10 Claims
Int. Cl. C08f 7/02, 41/12

ABSTRACT OF THE DISCLOSURE

Molding compositions of the ABS polymer type, and specifically substantially transparent compositions of tertiary alkylstyrenes, acrylonitrile and rubbery butadiene polymers.

A method of making the polymers by dissolving the rubbery polymer in the monomers and heating the solution to interpolymerize the monomers and the rubber.

---

This application is a continuation-in-part of our application Ser. No. 292,063 filed July 1, 1963, now abandoned.

This invention concerns new polymeric products of tertiary alkyl styrnes, acrylonitrile and rubbery polymers of conjugated diolefins. It relates more particularly to resinous moldable thermoplastic interpolymers of improved clarity containing in chemically combined from a tert.-alkyl styrene, acrylonitrile and a rubbery conjugated diolefin polymer.

It is known to prepare polymeric compositions by blending graft copolymers of polybutadiene, styrene and acrylonitrile with resinous interpolymers of alpha-methyl styrene and acrylonitrile, which compositions possess good mechanical properties such as impact value, tensile strength, hardness and heat distortion point. Such polymeric compositions are useful in the fabrication of various structural shapes such as sheet and moldings.

It has now been discovered that polymeric compositions possessing a high degree of clarity or transparency together with good mechanical properties can readily be obtained by polymerizing a tert.-alkyl styrene containing from four to eight carbon atoms in the tertiary alkyl group and acrylonitrile in the presence of a rubbery homopolymer or copolymer of one or more conjugated diolefins as hereinafter described.

The new polymeric products are interpolymers or graft copolymers of the tert.-alkyl styrene or a mixture of a major proportion by weight of the tert.-alkyl styrene and a minor proportion of one or more monovinyl aromatic hydrocarbons having the general formula

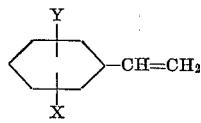

wherein X and Y each represents a member of the group consisting of hydrogen and alkyl radicals containing from 1 to 3 carbon atoms, and acrylonitrile, upon a rubbery polymer substrate consisting of (a) homopolymers and copolymers of two or more conjugated diolefins having the formula

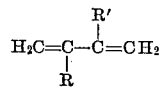

wherein R and R' each represents a member of the group consisting of hydrogen and the methyl radical, or (b) rubbery copolymers of one or more of said conjugated diolefins and one or more of said monovinyl aromatic hydrocarbons and/or acrylonitrile.

The conjugated diolefin polymer substrate to be employed as the backbone polymer in the preparation of the graft copolymer compositions can be a homopolymer of a conjugated diolefin such as butadiene-1,3, isoprene, or dimethyl butadiene, or a copolymer of two or more of said diolefins, or copolymers of said diolefins and acrylonitrile or copolymers with monovinyl aromatic hydrocarbons such as styrene, vinyltoluene, vinylxylene, ethylvinylbenzene, isopropylstyrene, tert.-butylstyrene or diethylvinylbenzene, which polymers are rubbery or rubber-like synthetic rubbers. The rubbery polymers can be prepared in usual ways, e.g. by polymerization of the monomers in an inert organic solvent reaction medium using a stereospecific catalyst such as butyllithium, aluminum alkyls or titanium halides. Such synthetic rubbers are known and are available commercially.

It is important that the grafting monovinyl aromatic hydrocarbon be a tert.-alkyl styrene such as tert.-buty styrene, tert.-amyl styrene, tert.-hexyl styrene, or tert.-octyl styrene or consist of at least a major proportion by weight of a tert.-alkyl styrene with the remainder of the monovinyl aromatic hydrocarbon fraction or starting material being another monovinyl aromatic hydrocarbon such as styrene, vinyltoluene, vinylxylene, ethylvinylbenzene, isopropylstyrene, diethylvinylbenzene or diisopropylstyrene.

The compositions are prepared by dissolving the synthetic rubber, i.e. the conjugated diolefin polymer, in the monomers in proportions corresponding to from 60 to 80 percent by weight of the monovinyl aromatic hydrocarbon, consisting of at least a major proportion by weight of the tert.-alkyl styrene, from 12 to 30, preferably from 15 to 25, percent by weight of acrylonitrile, and from 2 to 28, preferably from 5 to 25, percent by weight of the synthetic rubber, i.e. the conjugated diolefin polymer, and heating the solution to polymerize the monomers.

Polymerization of the monomers can be carried out by heating the solution in mass, in emulsion, or while dispersed as droplets in an inert aqueous medium, i.e. in suspension, and at temperatures between about 60° and 180° C. and at atmospheric, subatmospheric or superatmospheric pressures.

Polymerization initiators such as benzoyl peroxide, ditert.-butylperoxide, dicumyl peroxide, tert.-butyl hydroperoxide, cumyl hydroperoxide, or tert.-butyl peracetate can be added, but are not required in the invention.

Upon completing the polymerization of the monomers, or when substantially all of the monomer has been consumed in the polymerization reaction, the graft copolymer or polymeric product can be recovered and the volatile ingredients separated therefrom in any usual way.

The following examples illustrate ways in which the principle of the invention has been applied but are not to be construed as limiting its scope.

EXAMPLE 1

A solution was prepared by dissolving 10 parts by weight of GR–S 1006, synthetic rubber (a copolymer of about 76.5 percent by weight butadiene and about 23.5 percent styrene, prepared in aqueous emulsion) having a Mooney number of 50 in 70 parts by weight of a fraction consisting of about 95% by weight para-tert.-butyl-styrene and 5% meta-tert.-butyl-styrene and adding thereto 17.5 parts by weight of acrylonitrile. The solution was heated in a closed elongated vessel and agitated by tumbling, or rotating of the vessel end over end, under time and temperature conditions as follows: 3 days at 95° C.; 3 days at 115° C.; and 1 day at 140° C. The polymer was removed from the vessel and was ground to a granular form. The ground polymer was heated in a vacuum oven at 150–160° C. under 1.5 millimeters absolute pressure for a period of 16 hours to remove volatile ingredients. The devolatilized polymer was crushed to a granular form suitable for molding. Portions of the devolatilized polymer were injection molded to form test bars of 1/8 x 1/2 inch cross section. These test bars were used to determine tensile strength and percent elongation for the polymer employing procedures similar to those described in ASTM D638–57T. Impact strength was determined by procedure similar to those described in ASTM D256–57T. Other molded test pieces were used to determine a Vicat softening point for the polymer. Volatile ingredients were determined by heating a weighed portion of the ground polymer in a vacuum oven at a temperature of 213° C. and 1 millimeter absolute pressure for a period of 30 minutes, then re-weighing the test portion. The loss in weight represents the amount of volatile ingredients. The polymer had the properties reported under A below.

For purpose of comparison, a similar solution was prepared from styrene, acrylonitrile and the synthetic rubber, and was polymerized, and the polymer tested, as described above. This polymer had the properties reported under B below.

|  | A | B |
|---|---|---|
| Tensile strength (lbs./sq.in.) | 5,610 | 5,800 |
| Elongation (percent) | 11.9 | 6.5 |
| Notched impact strength (ft.-lbs.) | 2.19 | 1.76 |
| Vicat softening point (° F.) | 252 | 217 |
| Volatile (percent) | 2 | 1.7 |
| Color | (1) | Opaque |

1 Transparent.

EXAMPLE 2

A solution consisting of 20 parts by weight of synthetic GR–S 1006 type rubber similar to that employed in Example 1, dissolved in 64 parts by weight of tert.-butyl-styrene and 16 parts by weight of acrylonitrile was prepared and polymerized in a manner similar to that employed in Example 1. The polymer product had the properties:

Tensile strength _____ lbs./sq. in.__ 4390
Elongation _____ percent__ 20.3
Notched impact strength _____ ft.-lbs.__ 4.16
Vicat softening point _____ ° F.__ 235
Color _____ Transparent

EXAMPLE 3

A solution was prepared by dissolving in 74 parts by weight of tert.-butylstyrene, 10 parts by weight of a stereospecific polybutadiene rubber having a Mooney number ML 1+4 (212° F.) of 35, i.e. Firestone Synthetic Rubber and Latex Company, "Diene," consisting of over 90 percent 1,4 addition and only about 7.5 percent vinyl structure, the cis-1,4 configuration comprising 32 to 35 percent of the polymer, and which polybutadiene rubber was of narrow molecular weight distribution, and adding thereto 16 parts by weight of acrylonitrile. The solution was heated in a closed elongated vessel and was agitated by rotating or tumbling of the vessel end over end to polymerize the monomer under time and temperature conditions as follows: 3 days at 95° C.; 3 days at 115° C.; and 1 day at 140° C. The polymer was removed from the containers and was ground to a granular form. The ground polymer was heated in a vacuum oven at 150–160° C. under 1.5 millimeters absolute pressure for a period of 16 hours to remove volatile ingredients, then was cooled and crushed to a granular form. Portions of the product were injection molded to form test pieces which were used to determine the properties of the products employing procedures similar to those employed in Example 1. For purpose of comparison, similar compositions were prepared from solutions of styrene monomer, polybutadiene rubber and acrylonitrile under otherwise similar conditions. The compositions had the properties:

|  | A | B | C |
|---|---|---|---|
| Tert.-butylstyrene | 74 | 70 | 0 |
| Styrene | 0 | 0 | 70 |
| Acrylonitrile | 16 | 15 | 15 |
| Rubber | 10 | 15 | 15 |
| Tensile strength | 4,500 | 3,790 | 5,380 |
| Elongation | 16.2 | 20.8 | 8.2 |
| Impact strength | 2.0 | 3.3 | 1.4 |
| Vicat softening point | 118 | 121.5 | 102.5 |
| Color | (1) | (1) | Opaque |

1 Transparent.

EXAMPLE 4

A solution consisting of 5 parts by weight of synthetic GR–S rubber similar to that employed in Example 1, dissolved in 35.8 parts by weight of tert.-butylstyrene, 35.8 parts of styrene and 20.8 parts of acrylonitrile was prepared and polymerized employing procedures similar to those in Example 1. The polymer product had the properties.

Tensile strength _____ lbs./sq. in.__ 7880
Elongation _____ percent__ 6.4
Notched impact strength _____ ft.-lbs.__ 1.41
Vicat softening point _____ ° C.__ 107
Color _____ Transparent

EXAMPLE 5

A composition similar to that of Example 4 was prepared except using 5 parts by weight of stereospecific polybutadiene rubber similar to that employed in Example 3. The polymer product had the properties:

Tensile strength _____ lbs./sq. in.__ 6480
Elongation _____ percent__ 25.2
Notched impact strength _____ ft.-lbs.__ 1.73
Vicat softening point _____ ° C.__ 108
Color _____ Transparent

EXAMPLE 6

A solution consisting of 5 parts by weight of GR–S 1006 synthetic rubber dissolved in 72 parts by weight of tert.-butylstyrene and 18 parts by weight of acrylonitrile was prepared and polymerized employing procedures similar to those employed in Example 1. The polymer product had the properties:

Tensile strength _____ lbs./sq. in.__ 6460
Elongation _____ percent__ 10.1
Notched impact strength _____ ft.-lbs.__ 1.38
Vicat softening point _____ ° C.__ 110
Color _____ Transparent

EXAMPLE 7

A composition was prepared by polymerizing a solution consisting of 7.5 parts by weight of GR–S 1006 synthetic rubber dissolved in 72 parts of tert.-butylstyrene and 18 parts of acrylonitrile, employing procedures similar to those employed in Example 1. The composition had the properties:

Tensile strength _____ lbs./sq. in.__ 6170
Elongation _____ percent__ 15.8
Notched impact strength _____ ft.-lbs.__ 1.89
Vicat softening point _____ ° C.__ 112
Color _____ Transparent

EXAMPLE 8

Compositions similar to those of Example 6 and 7 respectively were prepared, except using stereo-specific homopolymer of butadiene similar to that employed in Example 3. The polymer products had the properties:

|  | A | B |
|---|---|---|
| Polybutadiene rubber (percent) | 5 | 7.5 |
| Tensile strength (lbs./sq. in.) | 5,760 | 4,730 |
| Elongation (percent) | 20.6 | 25.0 |
| Notched impact strength (ft.-lbs.) | 1.42 | 1.39 |
| Vicat softening point (° C.) | 118.5 | 118 |
| Color | (1) | (1) |

1 Transparent.

EXAMPLE 9

A solution consisting of 10 parts by weight of polyisoprene, "coral rubber," dissolved in 80 parts by weight of tert.-butylstyrene and 20 parts of acrylonitrile was prepared and polymerized employing procedures similar to those employed in Example 1. The polymer product had the properties:

| | |
|---|---|
| Tensile strength lbs./sq. in. | 6700 |
| Elongation percent | 5.5 |
| Notched impact strength ft.-lbs. | 1.48 |
| Vicat softening point ° C. | 117 |
| Color | Transparent |

EXAMPLE 10

A composition similar to that of Example 9 was prepared, except using 7.8 parts of the polyisoprene rubber. The product had the properties:

| | |
|---|---|
| Tensile strength lbs./sq. in. | 8520 |
| Elongation percent | 4.9 |
| Notched impact strength ft.-lbs. | 1.97 |
| Vicat softening point ° C. | 114 |
| Color | Transparent |

EXAMPLE 11

A composition similar to that of Example 10 was prepared using 7.5 parts of the polyisoprene rubber and 2.5 parts of white mineral oil as plasticizer and flow agent for the polymer product. The product had the properties:

| | |
|---|---|
| Tensile strength lbs./sq. in. | 6820 |
| Elongation percent | 11.9 |
| Notched impact strength ft.-lbs. | 1.45 |
| Vicat softening point ° C. | 108 |
| Color | Transparent |

EXAMPLE 12

A solution was prepared by dissolving in 74 parts by weight of tert.-octylstyrene, 10 parts by weight of a stereospecific polybutadiene rubber having a Mooney number ML 1+4 (212° F.) of 35, i.e. Firestone Synthetic Rubber and Latex Company, "Diene", consisting of over 90 percent 1,4 addition and only about 7.5 percent vinyl structure, the cis-1,4 configuration comprising 32 to 35 percent of the polymer, and which polybutadiene rubber was of narrow molecular weight distribution, and adding thereto 16 parts by weight of acrylonitrile. The solution was heated in a closed elongated vessel and was agitated by rotating or tumbling of the vessel end over end to polymerize the monomer under time and temperature conditions as follows: 3 days at 95° C.; 3 days at 115° C.; and 1 day at 140° C. The polymer was removed from the container and was ground to a granular form. The ground polymer was heated in a vacuum oven at 150–160° C. under 1.5 millimeters absolute pressure for a period of 16 hours to remove volatile ingredients, then was cooled and crushed to a granular form. Portions of the product were injection molded to form test pieces 0.1 inch thick. The moldings were transparent and had good mechanical properties.

EXAMPLE 13

A solution was prepared by dissolving in 74 parts by weight of tert.-amylstyrene, 10 parts by weight of a stereospecific polybutadiene rubber having a Mooney number ML 1+4 (212° F.) of 35, i.e. Firestone Synthetic Rubber and Latex Company, "Diene," consisting of over 90 percent 1,4 addition and only about 7.5 percent vinyl structure, the cis-1,4 configuration comprising 32 to 35 percent of the polymer, and which polybutadiene rubber was of narrow molecular weight distribution, and adding thereto 16 parts by weight of acrylonitrile. The solution was heated in a closed elongated vessel and was agitated by rotating or tumbling of the vessel end over end to polymerize the monomer under time and temperature conditions as follows: 3 days at 95° C.; 3 days at 115° C.; and 1 day at 140° C. The polymer was removed from the container and was ground to a granular form. The ground polymer was heated in a vacuum oven at 150–160° C. under 1.5 millimeters absolute pressure for a period of 16 hours to remove volatile ingredients, then was cooled and crushed to a granular form. Portions of the product were injection molded, to form test pieces 0.1 inch thick. The moldings were transparent and had good tensile strength, impact strength and a high heat distortion temperature.

EXAMPLE 14

A transparent product having good physical properties and similar to that obtained in Example 13, is obtained when tert.-hexylstyrene is used in place of the tert.-amylstyrene employed in said example.

We claim:

1. A substantially transparent composition of matter comprising a resinous thermoplastic interpolymer of from 60 to 80 percent by weight of a monovinyl aromatic hydrocarbon selected from the group consisting of (a) a tert.-alkyl styrene having from 4 to 8 carbon atoms in the alkyl group and (b) mixtures of a major proportion by weight of at least one of said tert.-alkyl styrenes and a minor proportion of a monovinyl aromatic hydrocarbon having the formula

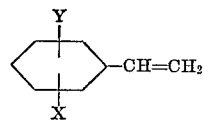

wherein X and Y each are independently selected from the group consisting of hydrogen and alkyl radicals containing from 1 to 3 carbon atoms, from about 12 to 30 percent by weight of acrylonitrile and from about 2 to 28 percent by weight of a synthetic rubber selected from the class consisting of homopolymers of conjugated diolefins having the general formula

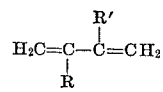

wherein R and R' are independently selected from the group consisting of hydrogen and the methyl radical, and copolymers of at least one such conjungated diolefin and monovinyl aromatic hydrocarbons having the above formula.

2. A composition as claimed in claim 1 wherein the tert.-alkyl styrene is tert.-amyl styrene.

3. A composition as claimed in claim 1 wherein the tert.-alkyl styrene is tert.-butylstyrene.

4. A composition as claimed in claim 1, wherein the tert.-alkyl-styrene is tert.-octyl styrene.

5. A composition as claimed in claim 1, wherein the synthetic rubber is polybutadiene.

6. A composition as claimed in claim 1, wherein the synthetic rubber is polyisoprene.

7. A composition as claimed in claim 1, wherein the synthetic rubber is a copolymer of butadiene and styrene.

8. A composition as claimed in claim 1 wherein the monovinyl aromatic compound is styrene and the synthetic rubber is stereospecific polybutadiene.

9. A process for making a substantially transparent resinous thermoplastic interpolymer which comprises dissolving from about 2 to 28 parts by weight of a synthetic rubber selected from the class consisting of homopolymers of conjugated diolefins having the general formula

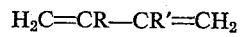

$$H_2C=CR-CR'=CH_2$$

wherein R and R' are independently selected from the group consisting of hydrogen and the methyl radical and copolymers of at least one such conjugated diolefin and monovinyl aromatic hydrocarbons having the formula

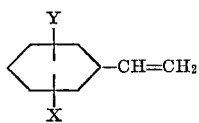

wherein X and Y are independently selected from the group consisting of hydrogen and alkyl radicals containing from one to three carbon atoms, in monomers in amounts of from 60 to 80 percent by weight of a monovinyl aromatic compound selected from the group consisting of (a) a tert.-alkyl styrene containing from 4 to 8 carbon atoms in the alkyl group and (b) mixtures of a major proportion of at least one of said tert.-alkyl styrenes and a minor proportion of a monovinyl aromatic hydrocarbon having the above formula, and from 12 to 30 percent by weight of acrylonitrile, and heating the solution at polymerization temperatures in the range of from about 60 to 180° C., to substantially polymerize the monomers and form a resinous, normally solid polymeric product.

10. A process as claimed in claim 9, wherein the tert.-alkyl styrene is tert.-butylstyrene, and the synthetic rubber is a stereospecific polybutadiene rubber.

References Cited

UNITED STATES PATENTS

| 2,723,261 | 11/1955 | Levine et al. | 260—88.1 |
| 2,943,075 | 6/1960 | Schweitzer | 260—880 |
| 3,243,481 | 3/1966 | Ruffing et al. | 260—880 |
| 3,278,642 | 10/1966 | Lee | 260—880 |

FOREIGN PATENTS

| 893,084 | 4/1962 | Great Britain. |

GEORGE F. LESMES, *Primary Examiner.*

U.S. Cl. X.R.

260—893, 4